Patented Apr. 10, 1945

2,373,515

UNITED STATES PATENT OFFICE 2,373,515

PURIFICATION OF MAGNESIUM

Philip T. Stroup and George F. Sager, New Kensington, Pa., assignors to Aluminum Company of America, Pittsburgh, Pa., a corporation of Pennsylvania No Drawing. Application March 30, 1942, Serial No. 436,764

9 Claims. (Cl. 75—67)

This invention relates to the purification of magnesium and it concerns more particularly the removal of iron from that metal while in the molten state.

The term "magnesium" as used herein and in the appended claims will be understood to refer not only to magnesium itself but also to alloys of that metal having a magnesium content of more than 80 per cent.

Iron is commonly present as an impurity in magnesium, being introduced, for example, as pick-up from iron equipment during production or melting operations or with various elements, such as aluminum, charged into the base metal to form alloys. Iron in magnesium is generally considered to be finely dispersed in a state of suspension throughout the magnesium matrix, and this finely dispersed iron, especially in amounts greater than about 0.005 per cent, usually causes a marked reduction in the resistance of magnesium to corrosive attack.

Because of the undesirable effect of iron, magnesium is sometimes treated in the molten state to reduce or to remove its iron content. The treatments commonly practiced employ manganese as an iron removing agent. In one of these treatments, manganese added to the molten magnesium is caused to precipitate, either by changing the temperature of the melt or by adding aluminum or by a combination of these procedures to decrease the solubility of the manganese, and the settling manganese carries iron impurity with it. In another of these treatments, a saturated solution of manganese is maintained in the molten magnesium until iron settles out.

Although iron can be removed with manganese, there are disadvantages in using manganese as an iron removing agent. First of all, except by methods requiring long periods of time, elevated temperatures are required for introducing manganese into magnesium and at such temperatures there is an increased tendency toward oxidation and burning of magnesium. Also, when manganese is employed as an iron removing agent, it is either necessary that the temperature of the melt be brought to a lower level or that aluminum be added to cause the settling of manganese and removal of iron to take place, which requires control in maintaining the proper sequence of temperatures or else an additional operation for introducing aluminum into the melt, or it is necessary that manganese be maintained in an amount sufficient to saturate the magnesium at a constant temperature while iron precipitates, and this not only takes time but also requires care in preventing settling of manganese.

An object of this invention is to provide an improved method for removing iron from magnesium. More particularly, an object is to provide a method for removing iron from magnesium which is more convenient in plant practice than the methods which employ manganese as an iron removing agent. A specific object of this invention is to provide a method for removing iron from molten magnesium which can be practiced commercially and with no particular temperature control and either before or after alloying ingredients such as aluminum are added.

We have observed that zirconium has the capacity for removing iron from molten magnesium. Except by methods requiring high temperatures and long treatments not ordinarily used in magnesium foundry procedure and which are not commercially practical, zirconium does not regularly reduce iron to the 0.005 per cent or less desired to give magnesium a satisfactory resistance to corrosion unless the zirconium is introduced as zirconium chloride.

Our invention, then, is predicated upon the discovery that the addition of zirconium chloride in amounts above about 0.25 per cent of the weight of the melt of magnesium effects a substantial reduction in the iron content of the molten metal, usually reducing the iron to the 0.005 per cent or less which is desired in a commercial product.

Zirconium chloride introduced into the melt to be purified in the practice of our invention reacts with magnesium, releasing zirconium. This zirconium chloride treatment appears to be far more satisfactory for removing iron than are treatments wherein zirconium is introduced in other ways. For example, in actual tests a melt of commercially pure magnesium was provided at 1300° F. with a 1 per cent content of zirconium granules. The melt thereupon was heated to 1750° F. to dissolve the granules into the base metal and then cooled to a pouring temperature at 1200° F. By this operation, the iron in the magnesium was found to have been decreased only from an initial 0.027 per cent to 0.015 per cent. In other tests wherein metallic zirconium was introduced into magnesium in other ways utilizing temperatures and periods of time customary in foundry practice, similar slight reductions in iron content were noted. In marked comparison were the results obtained in tests in which zirconium was introduced as zirconium chloride. For example, when a melt of commercially pure magnesium was treated by the method of our invention at 1450° F. with 4 per cent of a mixture consisting of 2 parts zirconium chloride, 1 part sodium chloride, and 1 part potassium chloride, the iron content of the magnesium was reduced from 0.028 per cent to 0.002 per cent. It will be understood that amounts of zirconium chloride or of mixtures containing zirconium chloride are expressed herein and in the claims by weight per cent with respect to the total weight of the melt.

The amount of zirconium chloride which is needed to reduce iron to about 0.005 per cent or less depends, of course, upon the extent to which the magnesium is contaminated. Usually the iron impurity of commercial magnesium and its alloys amounts to not more than about 0.04 per cent, and the addition of about 2 per cent of zirconium chloride usually suffices to reduce this amount of iron to an amount below which iron does not seriously impair resistance to corrosion, i. e., to 0.005 per cent or less. In ordinary practice, we prefer to add zirconium chloride in an amount between about 0.25 and about 3.0 per cent of the weight of the magnesium to be purified. When scrap and secondary magnesium are to be treated to reduce their iron content, however, it may be necessary to introduce larger amounts of zirconium chloride even up to about 5 per cent, since scrap and secondary magnesium may have an unusually large iron impurity. While larger amounts of zirconium chloride may be introduced into the melt in the practice of our invention, this is not economical and there appears to be little, if any, advantage in introducing more than the aforesaid amounts.

In the practice of our invention, zirconium chloride may be added in various ways to the impure magnesium. One method, which is particularly satisfactory because of the low specific gravity of zirconium chloride, is to introduce the zirconium chloride into the molten metal in briquetted form, the briquettes being sufficiently dense that they sink to the bottom of the melt. Upon reaction of the zirconium chloride with magnesium, zirconium becomes finely dispersed throughout the molten metal. Zirconium chloride also may be introduced into magnesium in admixture with other substances, particularly with substances such as salts which with the zirconium compound form a mixture having a melting point below the temperature of the magnesium into which the mixture is to be introduced and which is less volatile than zirconium chloride itself. These other substances may amount to between about 25 and 65 per cent of the total weight of the mixture and they should be of such a nature as to be without detrimental effect on the action of the zirconium chloride or on the magnesium and readily removable by conventional methods of removing salts from magnesium. We prefer to introduce the zirconium chloride in admixture with sodium chloride or potassium chloride or in admixture with combinations of these chlorides, the chlorides preferably being melted together and then solidified to form a cake which may conveniently be charged into the molten magnesium. A mixture consisting of 35 to 75 per cent zirconium chloride, the balance being sodium chloride and potassium chloride in substantially equal parts, is very satisfactory. Other ways for introducing zirconium chloride into magnesium will occur to those skilled in the art.

Although zirconium chloride reacts in the melt at any temperature above the melting point of magnesium, reaction becomes more rapid with higher temperatures. Because of the increased tendency of magnesium to oxidize and burn at elevated temperatures, it is advisable not to heat the magnesium above about 1750° F. during introduction of zirconium chloride and the purification treatment. We prefer to carry out the purification operation at temperatures between about 1300 and about 1600° F.

The actual manner in which the zirconium chloride operates to remove iron from magnesium is not clear. The chloride is believed to react with magnesium to introduce zirconium into the body of molten metal and this causes iron to precipitate to the bottom of the melt. Whether the iron is caused to settle because of the formation by the iron and zirconium of an insoluble intermetallic compound or because the zirconium precipitates and carries the iron down with it in mechanical admixture is undetermined. It is our belief that the introduction of zirconium chloride provides a zirconium content in a finer state of dispersion in the body of molten metal and consequently has a greater effect in removing iron than appears to result from zirconium introduced in other ways.

Following introduction of zirconium chloride in the melt, no further operation is necessary to cause separation of iron to take place. The zirconium chloride reacts instantly with the magnesium to provide zirconium in the melt, and this zirconium, even though nothing be done to affect its solubility, settles to the bottom of the melt, carrying iron with it. The separation of iron to the bottom of the melt takes place in a very short time, usually only about ½ minute being required for at least a substantial part of the iron to settle after the zirconium chloride is added. When melts of the sizes ordinarily treated in plant operations, and which contain the usual amounts of iron impurity, are treated with zirconium chloride, from about ½ minute up to about 15 minutes may be employed, depending upon the size of the melt, for the iron content of magnesium to be reduced to 0.005 per cent or less which is desired in a commercial product. Usually the settling of iron is sufficiently rapid that the magnesium is satisfactorily purified after the zirconium chloride is introduced into the melt by the time equipment can be made ready for the pouring of the magnesium from the crucible.

Substantially all of the zirconium settles with the iron to the bottom of the melt. Particularly if aluminum is present, very little, if any, of the zirconium remains in the magnesium. A slight amount of zirconium, usually not over about 0.4 per cent, may sometimes remain in the magnesium, especially if the magnesium is free from aluminum, but this zirconium usually is beneficial to the base metal since it may refine the grain and improve mechanical properties of magnesium and many of its alloys.

The separation of the precipitated iron from the magnesium can easily be accomplished. We prefer to decant the molten metal from the crucible, leaving the iron as a residue. Other means of separation, however, may be employed.

The operation of our invention is effective for purifying both magnesium itself and also magnesium containing the usual amounts of common alloying elements. For example, iron may be removed from magnesium base alloys containing from 1 to 15 per cent aluminum, 0.2 to 10 per cent zinc, 0.1 to 2.5 per cent manganese, 0.5 to 8 per cent tin, or combinations of these elements. Other elements also may be present as alloying ingredients in magnesium treated by the method of our invention.

The following examples illustrate the practice of the invention:

Example 1

A body of a magnesium base alloy containing 9.0 per cent aluminum, 0.1 per cent manganese, and 2.0 per cent zinc, and molten at a temperature of about 1400° F., was provided with 2 per zirconium chloride introduced in briquetted form so that the zirconium chloride would go to the bottom of the melt. Analysis of specimens taken both before and after the zirconium chloride was added demonstrated that the iron content of the alloy was decreased by the treatment with zirconium chloride from 0.028 to 0.005 per cent.

Example 2

At a temperature of 1450° F., a body of so-called commercially pure magnesium of about 99.9 per cent purity and containing 0.028 per cent iron was provided at a temperature of 1450° F. with 4 per cent by weight of a fused salt cake consisting of 2 parts zirconium chloride, 1 part sodium chloride, and 1 part potassium chloride. After 5 minutes, analysis test samples were cast, and these showed that the 0.028 per cent iron impurity had diminished to 0.002 per cent.

Example 3

With 1 per cent of the mixture of chlorides described in Example 2, a melt of a magnesium alloy weighing about 600 lbs. and nominally containing 6.5 per cent aluminum, 0.2 per cent manganese, and 0.7 per cent zinc was treated to reduce its iron content. By this treatment the iron in the alloy was reduced from 0.03 per cent to 0.004 per cent.

Example 4

Another 600 lb. melt of the same alloy described in Example 3 was treated with 2 per cent of the same flux mixture described in Example 2 and in the same manner as is described in Example 2. By this treatment a reduction in iron content from 0.03 per cent to 0.002 per cent was noted.

Example 5

By treatment with 1 per cent by weight of a fused salt cake consisting of 2 parts zirconium chloride, 1 part sodium chloride, and 1 part potassium chloride introduced into the alloy at a temperature of about 1350° F., the iron content of a 600 lb. molten alloy of magnesium nominally containing 8.5 per cent aluminum, 0.2 per cent manganese, and 0.7 per cent zinc was reduced from 0.02 to 0.002 per cent.

Example 6

A melt of a magnesium alloy weighing about 600 lbs. and nominally containing 2.8 per cent aluminum, 0.3 per cent manganese, and 1.0 per cent zinc was treated with 2 per cent of a mixture consisting of 2 parts zirconium chloride and 1 part each of sodium chloride and potassium chloride introduced at a temperature of about 1325° F. By analysis of test samples taken from the melt before and after treatment with the mixture of chlorides, it was found that the iron content was reduced from 0.009 per cent to 0.001 per cent.

Example 7

By treatment with 1 per cent of zirconium tetrachloride introduced into a molten magnesium base alloy containing 10 per cent aluminum at a temperature of about 1325° F., the iron content of the alloy was reduced in about 5 minutes from 0.035 per cent to 0.005 per cent.

Example 8

A magnesium base alloy was analyzed and found to contain 9.05 per cent aluminum, 0.22 per cent manganese, 2.04 per cent zinc, and 0.008 per cent iron. A 100 lb. melt of this alloy was provided with 1.75 per cent of zirconium chloride added to the melt in briquetted form. Analysis test samples were then cast in an iron mold and the iron content found to have decreased to 0.003 per cent. Zirconium in an amount of .03 per cent also was present in these latter test samples.

These examples will be understood to be illustrative of the practice of our invention and it will be appreciated that modifications which will occur to those skilled in the art will be within the scope of the invention.

We claim:

1. The method of removing iron from molten magnesium which consists in charging zirconium chloride into said molten magnesium in an amount sufficient to cause precipitation of iron, and separating the precipitated iron from the purified magnesium.

2. The method of removing iron from a body of molten magnesium which consists in charging at least about 0.25 per cent of zirconium chloride into said body of molten magnesium to cause precipitation of iron, and separating precipitated iron from the purified magnesium.

3. The method of removing iron from a body of molten magnesium which consists in charging between about 0.25 and 5.0 per cent of zirconium chloride into said body of molten magnesium to cause precipitation of iron, and separating the precipitated iron from the purified magnesium.

4. The method of removing iron from a body of molten magnesium which consists in charging at least about 0.25 per cent of zirconium chloride into said body of molten magnesium, permitting said body of magnesium to stand for a time between about one half minute and about 15 minutes while precipitation of iron in the magnesium takes place, and separating the precipitated iron from the purified magnesium.

5. The method of removing iron from a body of molten magnesium which consists in charging at least about 0.25 per cent of zirconium chloride into said body of molten magnesium to cause precipitation of iron, said zirconium chloride being in compacted form having a density greater than that of said magnesium, and separating precipitated iron from the purified magnesium.

6. The method of removing iron from a body of molten magnesium which consists in charging at least about 0.25 per cent of zirconium chloride into said body of molten magnesium to cause precipitation of iron therein, said zirconium chloride being in admixture with between about 25 and 65 per cent of at least one substance to provide a mixture consisting of said substance and zirconium chloride, said mixture being less volatile than zirconium chloride itself and having a melting point below the temperature of said body of molten magnesium, and separating precipitated iron from the purified magnesium.

7. The method of removing iron from a body of molten magnesium which consists in charging at least about 0.25 per cent of zirconium chloride into said body of molten magnesium to cause precipitation of iron, said zirconium chloride being in admixture with between about 25 and 65 per cent of at least one substance selected from the group consisting of sodium chloride and potassium chloride, and separating precipitated iron from the purified magnesium.

8. The method of removing iron from a body of molten magnesium which consists in charging at least about 0.25 per cent of zirconium chloride into said body of molten magnesium at a temperature between the melting point of said magnesium and about 1750° F. to cause precipitation of iron, and separating precipitated iron from the purified magnesium.

9. The method of removing iron from a body of molten magnesium which consists in charging between about 0.25 and 5 per cent of zirconium chloride into said body of molten magnesium at a temperature between about 1300° and about 1600° F. to cause precipitation of iron, and separating precipitated iron from the purified magnesium.

PHILIP T. STROUP.
GEORGE F. SAGER.